(12) United States Patent
Duxbury et al.

(10) Patent No.: US 8,924,531 B2
(45) Date of Patent: Dec. 30, 2014

(54) DETERMINING COMMUNICATION SESSIONS HAVING THE SAME PROTOCOL STRUCTURE

(75) Inventors: Neil Duxbury, Salisbury (GB); David Findlay, Romsey (GB)

(73) Assignee: Roke Manor Research Limited, Romsey Hampshire (GB)

( * ) Notice: Subject to any disclaimer, the term of this patent is extended or adjusted under 35 U.S.C. 154(b) by 171 days.

(21) Appl. No.: 13/365,760

(22) Filed: Feb. 3, 2012

(65) Prior Publication Data

US 2012/0254388 A1    Oct. 4, 2012

(30) Foreign Application Priority Data

Feb. 3, 2011 (GB) .................................. 1101875.1
Mar. 1, 2011 (GB) .................................. 1103492.3

(51) Int. Cl.
*G06F 15/173* (2006.01)
*G06F 15/16* (2006.01)
*G06F 17/30* (2006.01)
*H04L 12/26* (2006.01)

(52) U.S. Cl.
CPC ........ *G06F 17/30598* (2013.01); *H04L 43/026* (2013.01); *Y02B 60/33* (2013.01)
USPC ......................................... 709/223; 709/228

(58) Field of Classification Search
USPC ................................. 709/223, 228
See application file for complete search history.

(56) References Cited

U.S. PATENT DOCUMENTS

| | | | |
|---|---|---|---|
| 6,771,646 B1 | 8/2004 | Sarkissian et al. | |
| 8,359,326 B1 * | 1/2013 | Garg et al. | 707/767 |
| 2003/0135667 A1 | 7/2003 | Mann et al. | |
| 2004/0093513 A1 | 5/2004 | Cantrell et al. | |
| 2006/0107321 A1 | 5/2006 | Tzadikario | |
| 2006/0248200 A1 | 11/2006 | Stanev | |
| 2007/0011734 A1 | 1/2007 | Balakrishnan et al. | |
| 2009/0299977 A1 * | 12/2009 | Rosales | 707/3 |
| 2010/0054204 A1 | 3/2010 | Dolganow et al. | |
| 2010/0189004 A1 | 7/2010 | Mirandette et al. | |
| 2010/0235909 A1 * | 9/2010 | Eynon et al. | 726/22 |
| 2010/0284300 A1 | 11/2010 | Deshpande et al. | |
| 2011/0249572 A1 * | 10/2011 | Singhal et al. | 370/252 |
| 2012/0109956 A1 * | 5/2012 | Ramaiyer et al. | 707/737 |

FOREIGN PATENT DOCUMENTS

| | | |
|---|---|---|
| EP | 1420548 | 5/2004 |
| EP | 2084854 | 9/2012 |
| GB | 2422997 | 8/2006 |
| WO | 2008056349 | 5/2008 |
| WO | 2011114060 | 9/2011 |
| WO | 2011143817 | 11/2011 |

OTHER PUBLICATIONS

European Search Report for EP 12153860 mailed Apr. 12, 2012.

(Continued)

*Primary Examiner* — Jeong S Park
(74) *Attorney, Agent, or Firm* — Banner & Witcoff, Ltd.

(57) ABSTRACT

A method of grouping communication sessions, the method comprising: selecting a plurality of communications sessions from a data stream; determining which data structures, of said communication sessions, occur more frequently than chance; and sorting the communication sessions into groups, wherein communication sessions which have similar data structures, determined to occur more frequently than chance, are sorted into the same group.

16 Claims, 7 Drawing Sheets

(56) References Cited

OTHER PUBLICATIONS

Karagiannis, et al., "Is P2P Dying or Just Hiding?", Global Telecommunications Conference, 2004, IEEE Communications Society, Nov. 29-Dec. 3, 2004, pp. 1532-1538.

European Search Report in EP12153866 dated Mar. 30, 2012.
Further Search Report under Section 17(6) in GB1103492.3 dated Jan. 17, 2012.
Search Report under Section 17 in GB1103492.3 dated Jul. 1, 2011.
Further Examination Report dated Apr. 12, 2013 in New Zeland Application No. 597986.

* cited by examiner

DETERMINING COMMUNICATION SESSIONS HAVING THE SAME PROTOCOL STRUCTURE

CROSS-REFERENCE TO RELATED APPLICATIONS

This application claims priority to United Kingdom Application GB 1103492.3, filed Mar. 1, 2011, and United Kingdom Application GB 1101875.1, filed Feb. 3, 2011. Benefit of the filing date of each of these prior applications is hereby claimed. Each of these prior applications is hereby incorporated by reference in its entirety.

The present invention relates to a method and apparatus for communications analysis. In particular, it relates to a method and apparatus for determining communications sessions having the same protocol structure.

BACKGROUND TO THE INVENTION

It is possible to extract information from a data stream with knowledge of the communications protocols being used to send data. There is a need to be able to establish when communication sessions have similar structure which may be indicative of an unknown protocol.

SUMMARY OF THE INVENTION

In a first aspect, the present invention provides a method of grouping communication sessions, the method comprising: selecting a plurality of communications sessions from a data stream; determining which data structures, of said communication sessions, occur more frequently than chance; and sorting the communication sessions into groups, wherein communication sessions which have similar data structures, determined to occur more frequently than chance, are sorted into the same group.

In a second aspect, the present invention provides a method of grouping communications sessions, the method comprising: extracting a plurality of communication sessions from a data stream, each communication session comprising a sequence of characters; analysing the communication sessions to determine sequences of characters which exhibit repeatable behaviour; and sorting communications sessions having similar sequences of characters into groups.

In a third aspect, the present invention provides a method of configuring a sensor to extract data from a communication stream, using a group of communication sessions representing a particular communications protocol, the group comprising data structures representative of that protocol, the method comprising: generating a plurality of records representing said data structures, each record having a particular pattern; grouping said records based on the similarity of said patterns, such that each group includes records having the same pattern; generating a template based on the pattern of each group; and configuring said sensor using said template.

Further features of the invention are defined in the appended dependent claims.

BRIEF DESCRIPTION OF THE DRAWINGS

By way of example only, the present invention will now be described with reference to the drawings, in which.

DETAIL DESCRIPTION OF PREFERRED EMBODIMENTS

The first embodiment includes an apparatus and method for determining, from a raw data stream, communication sessions which have a common structure. Common structure in communication sessions may be taken to be indicative of use of a common communication protocol. Hence, using this method, it is possible to establish that unrelated communication sessions utilise common, but unknown, communication protocols. In the context of this description, a communication session is a unidirectional stream of data that is travelling from a single source to a single destination. It is therefore possible, using this method, to determine that communication protocols exist, without prior knowledge of those protocols.

Figure 1:
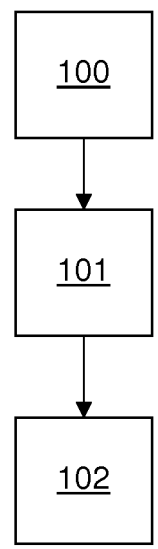
FIG. 1 is a flow diagram showing the operation of the present invention in a first embodiment.

FIG. 1 is a flow diagram showing the method of this embodiment. A plurality of communication sessions, contained within a raw data stream, are extracted (block 100). These communication sessions are then analysed to extract data structures which occur more frequently than would be expected by chance (block 101). Finally, communication sessions having similar extracted data structures are clustered together (block 102). Those communications sessions which have similar extracted data structures may be considered to be utilising the same communication protocols. The output of this process is at least one group of communication sessions considered to use the same communication protocol. Further details of how each of these steps is undertaken are provided below.

Figure 2:
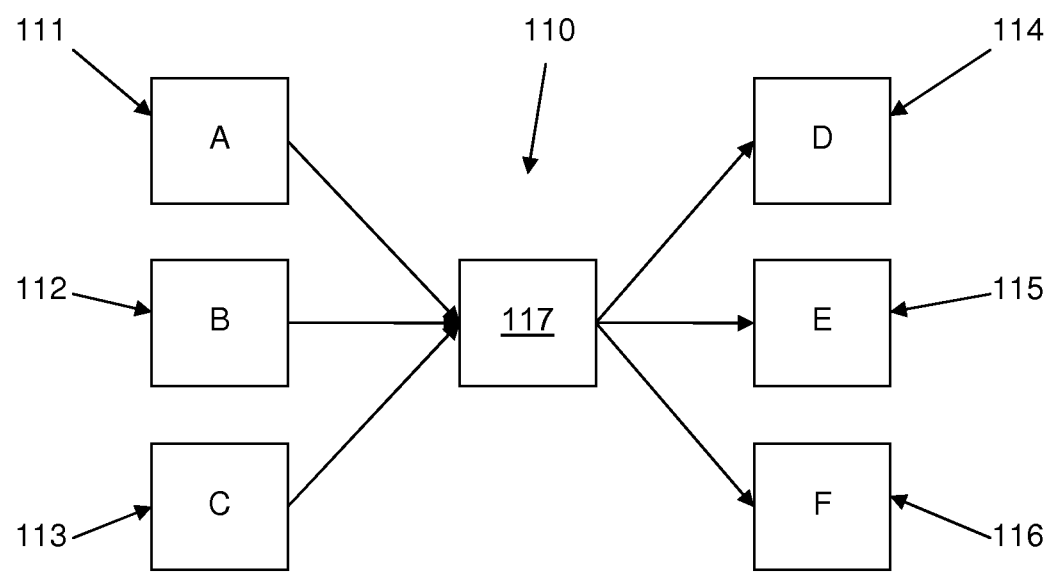
FIG. 2 shows a computer network in accordance with an embodiment of the present invention.

FIG. 2 shows a computer network 110 which includes several computer terminals. These computer terminals are referred to as endpoints. The Figure shows endpoints A 111, B 112, C 113, D 114, E 115 and F 116. The network 100 also includes a node 117. Data may be sent between the endpoints via node 117. This network is shown as an example of the kind of network which the present method may be used with in order to extract communication sessions. The network may be the Internet, for example. A simple network is shown here in order to demonstrate the principles of operation of the method. It will be appreciated that the network may be more complex than shown, as would be the case for the Internet.

Data may be sent between the endpoints. Typically data would be sent in the form of a series of data packets from one endpoint to another. For example, the data may be sent in accordance with TCP/IP. For the purposes of this example, the data sent across network 110 is done so using TCP/IP. Data is routed via node 117. In this respect, node 117 acts as a router. In practice, a network may contain many hundreds of nodes. For the purposes of explaining the present method, only one is required. The various endpoints all communicate with each other using one or more protocols (sub-protocols of the TCP/IP network protocols).

Figure 3:
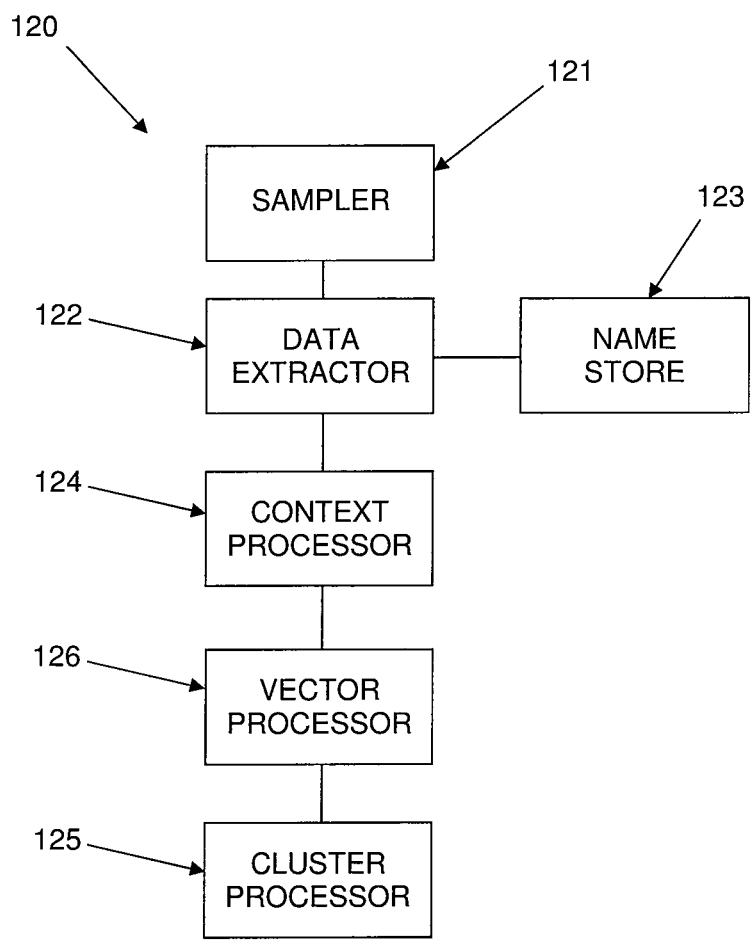
FIG. 3 shows a system in accordance with an embodiment of the present invention.
Figure 4:
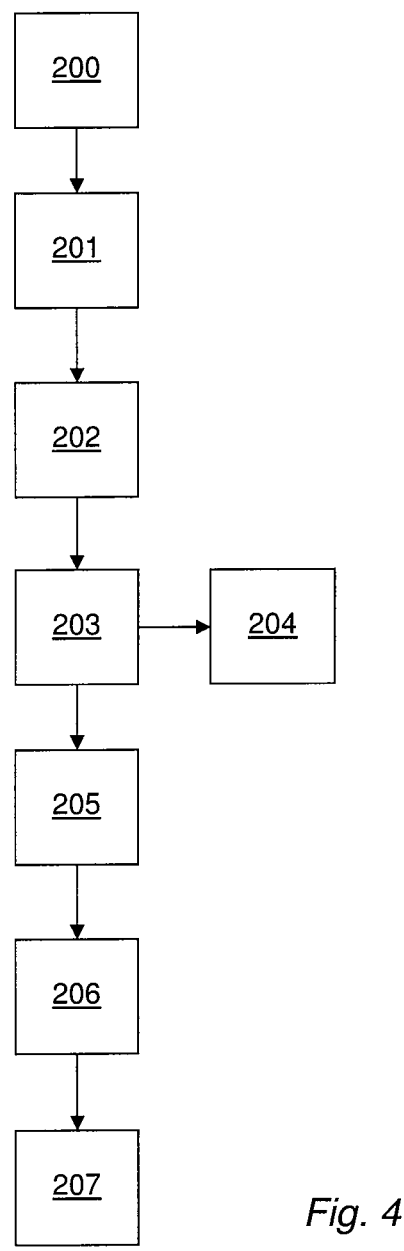
FIG. 4 shows a flow diagram showing the operation of the present invention in a further embodiment.

Further details of the components of the apparatus used to carry out the method will now be described. In this example, the apparatus is located within node 117. For the purposes of this example, the apparatus shall be referred to as a common data structure determination system 120. The system 120 is shown in FIG. 3. The system 120 includes the various components which are required to carry out the method. It will be appreciated that in practise, some of these components may be combined, or alternatively, that the functionality of some components is provided by two or more further components. It will also be appreciated that the components may be provided in hardware or software, the actual implementation not being relevant to the function of the method. FIG. 4 is a flow diagram showing the operation of the system 120.

The system includes a sampler 121. The sampler 121 is used to extract communication sessions from the raw data stream flowing through the node 117. The process of extracting a plurality of communications sessions is represented by block 200 in FIG. 4. The sampler 121 takes a sample of TCP/IP packets from the raw data stream (referred to hereinafter as the "bearer"). The sampler 121 randomly selects a packet. It then looks at the address information in that packet (IP/TCP/UDP) and then further selects all packets in the same session.

The sampler 121 may select the initial packet used to select the subsequent session data in a number of ways. For example, the sampler 121 may randomly select packets from the bearer. This may be done by selecting every nth packet from the bearer. Alternatively, this may be done by searching for a particular sequence of characters in the TCP sequence number field or by searching for a randomly generated pattern in the packet payload. Rather than randomly selecting packets, the sampler 121 may select all packets containing a particular data type; for example, HTTP or certain types of compressed data. As a further alternative, packets may be extracted by searching for randomly selected addresses in the Network and Transport Layer protocols. Regardless of the process chosen, the sampler extracts a large number of packets from a number of communication sessions.

Once the sampler 121 has extracted enough packets, the packets must be sorted into respective communication sessions. In other words, the packets are sorted into unidirectional streams of data between two endpoints, each endpoint being identified by an IP address. Such a stream is a communication session. This is achieved by sorting the packets into sets according to IP source address, IP destination address, IP source address, IP destination address, TCP source port number and TCP destination port number, IP source address, IP destination address, UDP source port number and UDP destination port number or permutations thereof.

For TCP, each set of packets is then put in a queue in TCP sequence number order and duplicated TCP data is removed. For any sets of packets that are carrying HTTP protocol data, the HTTP headers are analysed and the associated data encodings are determined. If required, the HTTP data payloads are decoded, so that the original, un-encoded data is recovered. A similar technique may be applied to UDP packets. Following the above process, reconstructed, un-encoded data streams are recovered. These are the communication sessions. For a typical analysis, several hundred megabytes may be sampled, resulting in several thousand sessions.

The system 120 further includes a data extractor 122. The purpose of the data extractor 122 is to locate strings of data which may be representative of protocol structure. In order to do this, the extractor 122 searches for entities located within each communication session. The idea behind this is that a message sent between two entities typically includes an identifier. For the purposes of this description, we shall call the identifier an entity. For example, the entity may be a real name, such as John or Sarah. Alternatively, the entity may be an email address, a username, a numeric identifier, a random string of characters, a pre-defined string of characters, or a media filename. In general, a protocol will contain data structures which define the operations of that protocol. For messaging protocols there will be data structures that contain addressee information. The addressee information is information designed into the protocol that is used to identify logical entities within that protocol, such as a user. Thus, for messaging protocols one might expect an entity to appear in close proximity to these protocol data structures. Therefore, if we can locate an entity this provides a means of identifying a potential protocol and of estimating where the data structures containing the addressee information might be found within a session carrying said protocol.

The data extractor 122 includes an entity store 123 which stores entities used as the basis for searches for the communications sessions. The data extractor 122 also contains a number of bespoke entity identifier methods. These methods include an email address identification method, a username identification method, a real name identification method, a numeric identifier identification method and a generalised search method. In the following, only the method utilising the generalised search approach is described. However, any of the above methods may be used in isolation or combination to provide the raw triple records described subsequently. In the context of this example, an entity is simply a string of characters which the data extractor 122 must search for in the communication sessions. In this case, the entity store includes a number of "real" names. In the present case, real names are used. In this example, the entity store 123 includes the name "Neil". The system 120 will therefore attempt to locate data in the communications streams which includes the name "Neil" and which may therefore relate to a message sent using a particular protocol.

The data extractor 122 searches through all of the communication sessions for the name "Neil" (block 201). Any communication sessions which include zero or one instance of the name "Neil" are excluded from further analysis. If the communication session includes two or more instances of the name "Neil", then it is used for further analysis.

When the data extractor 122 locates the name "Neil" it extracts the entity from the communication session, together with data in the immediate vicinity of the entity (block 202). As noted above, the data in the vicinity of an entity may be expected to include the structure of the protocol used to send any message associated with the entity. The data extractor 122 extracts a fore-string and an aft-sting. The fore-string is the set of characters immediately before the entity, and the aft-string is the set of characters immediately after the entity. The data extractor 122 therefore produces a triple associated with the entity (fore-string, entity, aft-string). The fore-string and aft-string are referred to as the entity's context.

In this case, the data extractor 122 locates all triples, across all communication sessions, including the name "Neil". In this case, the fore-string and aft-strong are chosen to be 12 characters each, in order that the principle of operation may be clearly shown. However, in practice the fore-string and aft-string may be any length. 128 characters has been found to be particularly suitable. One example of a triple may be:

123From__456:Neil;<To:>123456

Each triple is then associated with the communication session from which it came from. Following this process, it can be expected that a large number of triples include contexts which include protocol structure. However, some of the triples may contain no protocol structure. For example, if the name "Neil" is located in the middle of some message text, the context may well only be other parts of the body of the message. In the next stage, the system must differentiate between contexts with protocol structure, and contexts without such structure.

The system 120 includes a context processor 124. The context processor is responsible for processing all of the triples extracted by data extractor 122 in order to determine which contexts are associated with protocol structure. The context processor operates on the principle that protocol structure is likely to repeat itself across a number of contexts. Therefore, there is a requirement to distinguish between contexts which exhibit similarities with other contexts, and those that do not.

The context processor 124 is arranged to generate a plurality of ngrams from the context of each entity (block 203). An ngram is a sequence of n characters taken from the context. The context processor 124 is arranged to generate ngrams that overlap by n−1. In this example, n=4. However, n may be any number less than the length of the fore-string and aft-string. Ideally, n should be a low number, relative to the context length. Using the above example, the ngram sets would be as follows:

fore-string set: 123F, 23Fr, 3Fro, From, rom_, om_4, m_45, _456, 456:

aft-string set: ;<To, <To:, To:>, o:>1, :>12, >123, 1234, 2345, 3456

For each communication session, all of the ngrams are formed into a set which represents that session. Accordingly, a large number of sets of ngrams are produced, each set being associated with a particular communication session.

As noted above, the system 120 needs to establish which ngrams are likely to be part of a protocol structure, and which ngrams are not likely to be part of protocol structure. Protocols, by their design, consist of fixed syntax blocks carrying fixed or variable data. For communications traffic, those ngrams which form part of a protocol structure may be expected to occur more frequently than those that do not. For all ngrams across all communication session sets, the context processor 124 determines the session frequency for each ngram. This is simply the number of sessions in which the ngram occurs. The context processor 124 generates a histogram of the session frequencies.

Figure 5:
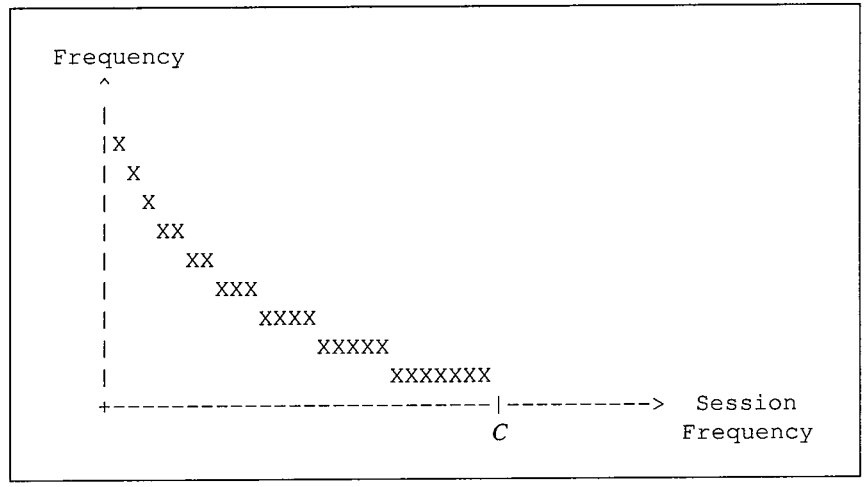
FIG. 5 is a histogram showing a plot of session frequency in the absence of any protocols.

FIG. 5 is a histogram which shows the expected plot where the distribution of ngrams is random, i.e. where no communications protocols are present. A large number of ngrams with low session frequency would be expected, with smoothly decreasing numbers as the session frequency increases. At a certain value of session frequency, the expected number of ngrams drops to zero. In FIG. 5, C represents the maximum expected observed session frequency. A typical value of C will be between 20 and 30.

Figure 6:
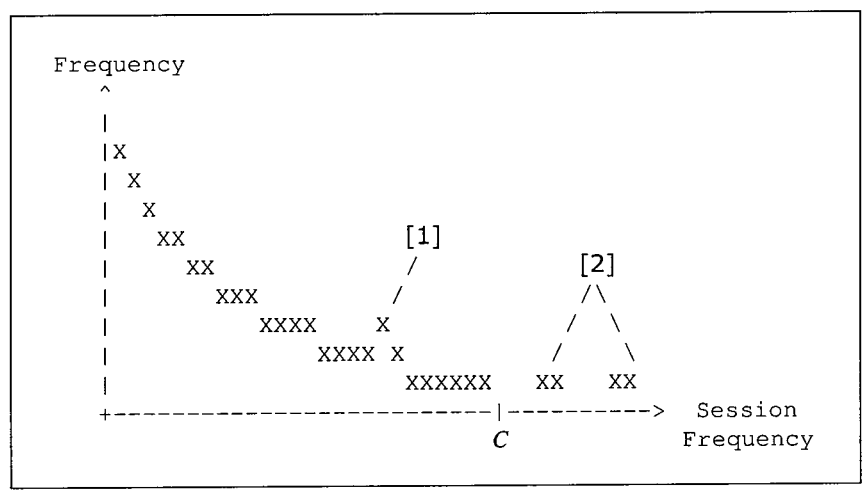
FIG. 6 is a histogram showing a plot of session frequency in the presence of communication protocols.

When a communication protocol is present, non-randomness will be expected in the distribution. This gives rise to two features, as shown in FIG. 6. Firstly, there will be significant departure from the smooth decrease. Secondly, session frequencies significantly above C are observed. These features are labelled as [1] and [2] respectively in FIG. 6. The ngrams which give rise to these anomalies are labelled as "interesting" ngrams. These ngrams are those which are expected to relate to part of a protocol structure. If, following this process, zero or very few "interesting" ngrams are located, the process terminates without producing any outputs (block 204).

Now that the interesting ngrams have been identified, each session is represented by a set of those interesting ngrams. The system 120 also includes a session cluster processor 125.

The session cluster processor 125 is arranged to group communication sessions which include similar ngrams, and which may therefore be assumed to include the same communications structure.

The session cluster processor 125 contains a vector processor 126. The vector processor 126 is arranged to allow the similarity of different sessions to be measured. To achieve this, the set of ngrams associated with each session are represented as a vector and vector analysis is used to establish how similar the sessions ngrams are to each other. The vector processor 126 is arranged to generate a vector to represent each session (block 205). Each interesting ngram in a session is designated a separate dimension of a vector. For example, using the fore-string noted above:

$123F=i$ $23Fr=j$ $3Fro=k$ etc

The session can then be represented by a vector V:

$V=i+j+k+l+m+n+o+p+q$

Those ngrams which occur with a higher frequency will result in a large vector component. Each session is represented by it's own vector. Accordingly, following vector processing, the cluster processor 125 holds a large number of vectors, each representing a session.

In order to determine which sessions are likely to include similar protocols, a distance measure is used. For example, a cosine similarity measure may be used to determine the angle between each vector. For each session in the collection the vector processor 126 calculates the distance between said session and each other session in the collection. These distances are then stored.

The set of distances and references to the sessions to which they belong are then provided to the cluster processor 125. The cluster processor then clusters (block 207) the sessions by using the distance between the sessions as a clustering metric. This establishes which sessions have similar properties. For example, an algorithm such as the 'Density-Based Spatial Clustering of Applications with Noise' (DBSCAN) may be used. An advantage of this algorithm is that it is fast and can locate arbitrarily-shaped clusters. When applying this algorithm in the present context, clusters range in size from a few to a few hundred sessions.

Following the clustering operation, each cluster is considered to include only sessions which use the same underlying communications protocols. The cluster processor does not determine what the protocol is, rather it determines the fact that a particular group of sessions have common structure which, with a high degree of certainty, can be assumed to represent a particular protocol.

The information relating to ngrams in each cluster may then be stored for further analysis. This may be in the form of human intervention, to visually inspect the ngrams to establish what protocols are being used. Alternatively, the interesting ngrams may be used to program a sensor to detect data in the raw data stream which contains those ngrams. This allows for the extraction of further sessions which contain protocol structure which is the same as that identified by the above process. This allows the identified protocols to be filtered out of the data stream without needing to record all of the traffic i.e. we only record the bit we are interested in which is the protocol data that fits the described model. The remaining data is discarded.

The above described embodiments relate to the identification of sessions which relate to the same communication protocols. The next stage focuses on whether the information associated with a cluster of sessions (abstract representation of a protocol) can be used to identify templates for the extraction of all instances of an entity from a protocol of interest. A template is defined that describes the expected use case of an entity (e.g. a user's identifier) within communications data. As described above, a triple defined by fore-string; entity; aft-string describes the entity and the surrounding protocol structure. This triple can be used to define a template having the form:

PATTERN ENTITY PATTERN

The purpose of the following embodiments is to automatically work out the format of this template given the session vector discovered above, and to do this in an unsupervised manner. Once a template has been established it will subsequently be used to extract every instance of an ENTITY from an arbitrary data stream. Here the ENTITY has the same definition as its did for the above-embodiments.

The PATTERN parts shown above are the fore-string and aft-string described previously. The PATTERN part may consist of a mixture of fixed and changing components. For example, the patterns:

From__123456; and
From__743 both have the characters 'From_' in common. The characters 123456 and 743 are dissimilar. The fact that we have already decomposing the fore-string and aft-strings into ngrams essentially allows the constant parts to be identified. Once the ngram is small enough, only the constant part will remain. For example, when the ngram length reaches 5 then, for the above example, the ngram components are:

From_, rom__1, om__12, m__123, 1234, 12345, 23456 and
From_, rom__7, om__74, m__743

We see here the only common component is 'From_'. It is the repeated appearance of this ngram that allows the protocol to be detected. If the whole string were used then we would find that the contexts described previously would not cluster together. Similarly if the ngrams were too small they would be indistinguishable from general characters.

In order to successfully extract the ENTITY part of the template the left and right hand edges of the fore-string and aft-string must be identified. In addition, the signatures that strongly define a protocol may not be the same as the signatures that define the content of interest. For example, the signature 'From_' may occur in many protocols and hence will be discarded by the first embodiments as it occurs in many sessions. However, the signature 'From_' could represent the sender of a message and is consequently of interest. Moreover in order to find the 'From_' part of the signature, we must know which bit of it is common to all instances as well as the parts of the signature that vary from instance to instance. This latter steps allows the variable bits to be ignored. However, we do need to know where the variable bit finishes in order to distinguish it from the ENTITY part.

In terms of the aft-string it is only necessary to identify a single character as it is simply used as a means to terminate the template. Thus the template can be slightly modified as:

PATTERN ENTITY TERMINAL_CHARACTER

A single record consisting of: "PATTERN TERMINAL_CHARACTER" can then be composed. The method and apparatus for establishing templates will now be described.

Figure 7:
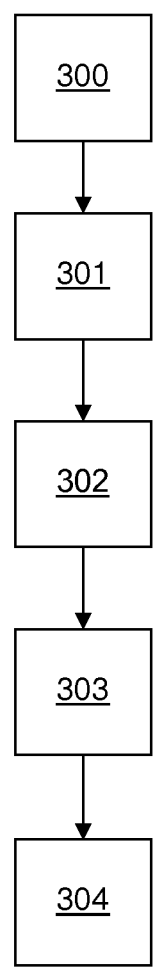
FIG. 7 is a flow diagram showing the operation of the present invention in a further embodiment.

FIG. 7 is a flow diagram showing the method of this embodiment. The ngrams from all sessions within a session cluster are extracted using the centroid vector for that cluster (block 300). The ngrams are then used to extract packets or sessions including those ngrams from the data stream (block 301). The extracted records are then clustered (block 302). The records in a particular record cluster can then be used to determine templates for extraction of additional records (block 303). Finally, the templates are used to configure a sensor (block 304) Further details of each of these steps will be provided below.

Figure 8:
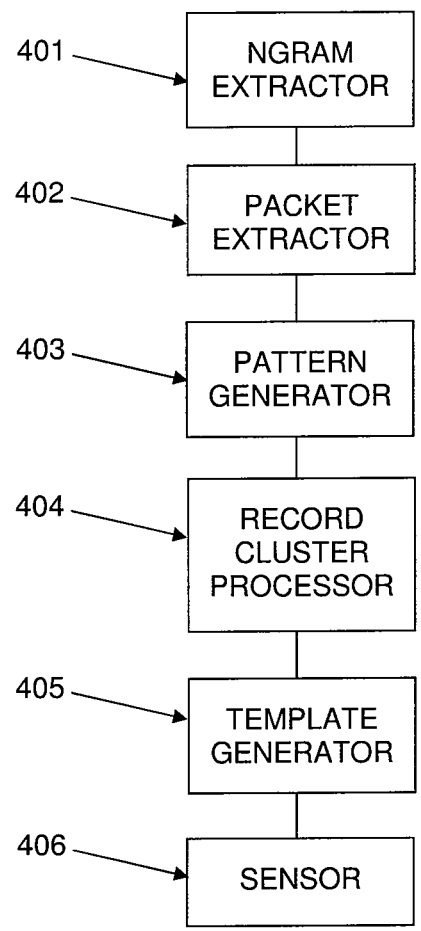
FIG. 8 shows a system in accordance with an embodiment of the present invention.
Figure 9:
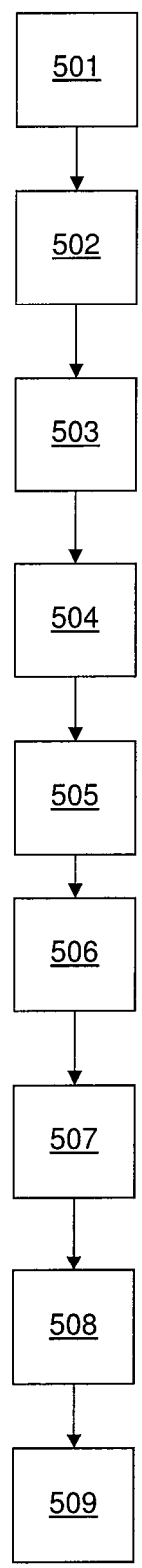
FIG. 9 is a flow diagram showing the operation of the present invention in a further embodiment.

The node 117 also includes a sensor configuration system 400. The system 400 is shown in FIG. 8. The system 400 includes the various components for carrying out the method. It will be appreciated that in practise, some of these components may be combined, or alternatively, that the functionality of some components is provided by two or more further components. It will also be appreciated that the components may be provided in hardware or software, the actual implementation not being relevant to the function of the method. FIG. 9 is a flow diagram showing the operation of the system 400.

The configuration system 400 includes an ngram extractor 401. The ngram extractor 401 extracts all ngrams from all sessions in a particular session cluster (block 501). This is done using the centroid vector of that session cluster. Accordingly, the system 400 generates a collection of all ngrams which appear in the contexts of the sessions from a particular cluster.

The extracted ngrams are then used to extract new sessions from the raw data stream flowing through node 117. The system 400 includes a packet extractor 402. The extractor 402 is configured conduct a string search of the raw data (block 502) for any of the ngrams identified above. The extractor 402 is programmed to extract any packet or session associated with a packet which includes one of the ngrams. The extractor 402 checks each hit within each packet to see if an entity is within 128 bytes of the located ngram (block 503). If so, the packet is kept and the associated session is captured. If not, the packet is discarded. Accordingly, a collection of packets/sessions is established, each of which has at least one ngram within 128 bytes of an entity. As an alternative to searching the raw data stream, the data extracted in the first embodiment can be searched instead. Similarly, data could also just be randomly sampled using the same techniques used in the first phase. The processing described above can then be applied to the captured data.

The system 400 also includes a pattern generator 403. The pattern generator 403 is arranged to formulate a pattern record from each of the ngrams hit within a session (block 504). Each of the above-noted ngrams is followed by an entity which in turn is followed by a string of characters. A pattern record is generated by taking the 128 bytes that proceed the entity (called the PATTERN) and a single byte following the entity (called the TERMINAL STRING). Accordingly, a collection of pattern records having the format PATTERN+TERMINAL STRING are generated.

The configuration system 400 also includes a record cluster processor 404. The record cluster processor 404 selects two records and matches them using the Needleman-Wunsch algorithm (block 505). This algorithm aligns two strings of characters using a similarity matrix. Accordingly, the pattern records are aligned with respects to similar groups of characters. For example, take the following four records (and entities):

123From__457:another@hotmail.com;
124From__458:another@gmail.com;
125From__459:another@gmail.com;
126From__460:another@gmail.com;

The algorithm would align the records so that the common characters "From_" are aligned. Effectively, the algorithm identifies where the records are similar and where they are different. This is applied to all pairs of records which have been extracted from a session.

The record cluster processor 404 then applies the output of the Needleman-Wunsch algorithm to a similarity measure (block 506). For example, a cosine-like similarity measure may be used.

However, a problem with the standard cosine measure is that it discards the information associated with the sequence of the characters within a record. For example, the string abcdabcd can be represented as the vector 2i+2j+2k+2l (a→i, b→j, c→k, d→l). However the information that b follows a and c follows b has been lost. In the current case the order of the characters as well as their value is important. In addition, the standard cosine approach doesn't naturally handle misaligned sections of data. Vector components that are not shared by the vectors are ignored when a dot product is formed. Consequently, an alternative distance measure is used. Notionally, this measure constructs a right-angled triangle with sides having length x and y on either side of the right-angle. Regions where the two records are the same contribute to an increase in the length of side x and regions where the two records are different contribute to an increase in the length of side y. The angle which represents the similarity between the two records can then be identified by $\tan^{-1}(y/x)$.

The operation of this function is also weighted to prevent unwanted skews in the distance measure. In particular:

For runs of matching characters the x axis is not increased indefinitely, here the x axis extension produced falls off exponentially for each additional character within the run. This presents long runs of positively aligned characters from dominating the distance measure.

For sequences that are mismatching there are a couple of possibilities:

Wildcard matches can contribute to the x axis extension e.g. wildcard numeric will match any number but not as strongly as an exact match e.g. 8 matches 8 exactly but 9 is still a wildcard numeric match thus an alignment such as this still extends the x axis; and Where there is a run of mismatches/partial matches the approach will calculate what the highest extension score is for the whole run. This will then be used to extend the y axis for the run of mismatching characters. Thus, the extension of the y axis for a run of characters is capped.

The sequence information is essentially provided by a combination of the extension calculations and the alignment provided by the Needleman-Wunsch algorithm:

If a number of character runs are aligned successfully then the contribution to the x axis extension will be higher; and If the number of character runs is low and the alignment is bad this will lead to a higher contribution to the y axis extension.

Thus, the character sequencing will become evident through the angle between the candidate records.

The output of this part of the process is data concerning the similarity of all the aligned records with respect to each other.

The record cluster processor 404 then applies a cluster algorithm to the similarity data produced by the similarity measure (block 507). The aim of this process is to identify common sections of the records which can be used to derive sensor configuration patterns. Accordingly, fairly "compact" clusters are required. It has been found that a "k-means-like" algorithm gives good results. It can then be assumed, with a high degree of certainty, that each record cluster includes records having the same protocol structure. The four records noted above may be an example of this.

In order to use a k-means-like algorithm, a representation of a cluster is required that is compatible with an individual record. To meet this requirement, a cluster is represented as a wild-carded record. This is just like a regular record, except that some of the characters are replaced by "wild cards" that can represent either single instances or extended sequences of numeric, alphabetic, or arbitrary characters. Use of this representation has required a small extension to the usual Needleman-Wunsch algorithm so that it can operate with the wild-carded records. However, once two records are matched, it does become fairly clear how to construct an appropriate wild-carded record: where the two individual records match, the common text is simply selected. Where there is a difference, the nature of the difference determines the kind of "wild card" that is substituted.

The Needleman-Wunsch algorithm has been extended so that the class of items in the strings has expanded. Instead of being restricted to literal characters, the class of items now includes a number of wild cards or character classes, such as <digit> (numbers), <space> (whitespace), <alphanumeric> (letter or numbers), etc. The comparison weight function is extended to handle the wild cards so that, for example, matching a literal '1' with <digit> gives a reasonable match weight; matching <digit> and <space> gives a mismatch. The insert cost function is modified slightly to favour extending wildcards so that it's good to insert a digit immediately next to a match against <digit>, for example.

Once the best alignment has been found, the whole is encoded as a new wild carded string (if this is required—e.g. to follow a cluster centre). New or modified wildcards are added where the two sequences do not align perfectly. Simple examples include:

food match ford→fo<alphanumeric>d
freda match fred1a→fred<digit>a
fred2a match fred<digit>a→fred<digit>a
fred<digit>a match fren2a→fre<alphanumeric>a
fre<alphanumeric>a match fo<alphanumeric>d→f<alphanumeric>

So, if you'd decided that food, ford, freda, fred1a, fred2a and fren2a were all in the same cluster, you'd get the cluster centre f<alphanumeric>. At some point, the character counts are restored so that it's known there are between 3 and 5 characters in the match against <alphanumeric>; the appropriate regular expression is then easily formed as f<3-5 alphanumeric>.

This representation of a cluster also helps in construction of the associated sensor configuration pattern (block 508). The wild carded record corresponds naturally to a regular expression that can be used to match the text that surrounds the occurrence of a entity. The configuration system 400 also includes a template generator 405. The template generator 405 generates sensor configuration templates, based on the clustered records (block 509). The sensor configuration pattern consists of this expression combined with an additional expression to match and output the entity itself. For example, a cluster containing the above-noted contexts may have a representation such as:

xxxFrom_xxx:entity;

This is then used to program a sensor 406 to extract all data containing this structure. This data may then be stored for further analysis.

Features of the present invention are defined in the appended claims. While particular combinations of features have been presented in the claims, it will be appreciated that other combinations, such as those provided above, may be used.

The above embodiments describe one way of implementing the present invention. It will be appreciated that modifications of the features of the above embodiments are possible within the scope of the independent claims.

The invention claimed is:

1. A method of grouping communication sessions, the method comprising:
   selecting a plurality of communications sessions from a data stream;
   searching each of said communication sessions for at least one entity;
   extracting each occurrence of said at least one entity and at least one context of the at least one entity, wherein each at least one context is a predetermined number of characters before, after, or before and after one of said at least one entity;
   determining which data structures, of said communication sessions, occur more frequently than chance based on data structures within said contexts; and
   sorting the communication sessions into groups, wherein communication sessions which have similar data structures, determined to occur more frequently than chance, are sorted into the same group.

2. A method according to claim 1, further comprising generating a plurality of data structures from each context.

3. The method of claim 2, further comprising generating a vector to represent each communication session, wherein the data structures are the vector components.

4. The method of claim 3, further comprising using a similarity measure to determine the distance between session vectors.

5. The method of claim 4, wherein said sessions are sorted into groups using a clustering algorithm.

6. The method of claim 1, wherein a data structure of a context is a sub-sequence of characters within a context.

7. The method of claim 6, wherein said data structures are a plurality of overlapping ngrams.

8. The method of claim 7, wherein an ngram is n consecutive characters, and each ngram overlaps by n−1.

9. The method of claim 7, further comprising plotting a histogram of ngram session frequencies.

10. The method of claim 9, further comprising identifying ngrams which occur more frequently than chance.

11. The method of claim 1, wherein the step of selecting sessions includes sampling packets of data from the data stream and reconstructing sessions from the packets.

12. An apparatus comprising:
   a computer; and
   a computer readable medium having computer code stored thereon, that when executed by the computer, causes the apparatus to:
      select a plurality of communications sessions from a data stream;
      search each of said communication sessions for at least one entity;
      extract each occurrence of said at least one entity and at least one context of said at least one entity, wherein each at least one context is a predetermined number of characters before, after, or before and after one of said at least one entity;
      determine which data structures, of said communication sessions, occur more frequently than chance based on data structures within said contexts; and
      sort the communication sessions into groups, wherein communication sessions which have similar data structures, determined to occur more frequently than chance, are sorted into the same group.

13. A non-transitory computer readable medium having code stored thereon which, when run on a computer, causes the computer to:
   select a plurality of communications sessions from a data stream;
   search each of said communication sessions for at least one entity;
   extract each occurrence of said at least one entity and at least one context of said at least one entity, wherein each at least one context is a predetermined number of characters before, after, or before and after one of the at least one entity;
   determine which data structures, of said communication sessions, occur more frequently than chance based on data structures within said contexts; and
   sort the communication sessions into groups, wherein communication sessions which have similar data structures, determined to occur more frequently than chance, are sorted into the same group.

14. A method of grouping communication sessions, the method comprising:
   extracting a plurality of communications sessions from a data stream;
   searching the sessions for at least one entity, the entity being a string of characters;
   selecting the entities and the associated entity contexts, a context being a string of characters of a predetermined length before, after, or before and after an entity;
   dividing the contexts into a plurality of context elements, a context element being a string of characters which is shorter than the context;
   determining which context elements occur more frequently than chance;
   representing each communications session using the context elements determined to occur more frequently than chance;
   expressing the representation as a vector, where each context element is a component of the vector;
   comparing each session using a similarity measure; and
   clustering the sessions based on vector similarity.

15. An apparatus comprising:
   a computer; and
   a computer readable medium having computer code stored thereon, that when executed by the computer, causes the apparatus to:
      extract a plurality of communications sessions from a data stream;
      search the sessions for at least one entity, the entity being a string of characters;
      select the entities and the associated entity contexts, a context being a string of characters of a predetermined length before, after, or before and after an entity;
      divide the contexts into a plurality of context elements, a context element being a string of characters which is shorter than the context;
      determine which context elements occur more frequently than chance;
      represent each communications session using the context elements determined to occur more frequently than chance;
      express the representation as a vector, where each context element is a component of the vector;
      compare each session using a similarity measure; and
      cluster the sessions based on vector similarity.

16. A non-transitory computer readable medium having code stored thereon which, when run on a computer, causes the computer to:
- extract a plurality of communications sessions from a data stream;
- search the sessions for at least one entity, the entity being a string of characters;
- select the entities and the associated entity contexts, a context being a string of characters of a predetermined length before, after, or before and after an entity;
- divide the contexts into a plurality of context elements, a context element being a string of characters which is shorter than the context;
- determine which context elements occur more frequently than chance;
- represent each communications session using the context elements determined to occur more frequently than chance;
- express the representation as a vector, where each context element is a component of the vector;
- compare each session using a similarity measure; and
- cluster the sessions based on vector similarity.

* * * * *